United States Patent [19]

Aragon

[11] Patent Number: 4,767,511

[45] Date of Patent: Aug. 30, 1988

[54] CHLORINATION AND PH CONTROL SYSTEM

[76] Inventor: Pedro J. Aragon, 306 Highpoint Dr., Wadsworth, Ohio 44281

[21] Appl. No.: 27,610

[22] Filed: Mar. 18, 1987

[51] Int. Cl.[4] .............................................. C25B 1/00
[52] U.S. Cl. .................................... 204/128; 204/237; 204/228; 204/263; 204/266; 210/169; 210/743; 210/746; 210/754; 210/765
[58] Field of Search ................. 204/128, 1 B, 98, 280, 204/283, 266, 263, 237, 228; 210/743, 746, 754, 765, 169

[56] References Cited

U.S. PATENT DOCUMENTS

| Re. 30,864 | 2/1982 | Justice et al. | 204/98 |
|---|---|---|---|
| 571,591 | 11/1896 | Hargreaves et al. | 204/295 |
| 636,142 | 10/1899 | Hodgson | 204/295 |
| 3,022,244 | 2/1962 | Le Blanc et al. | 204/266 |
| 3,351,542 | 11/1967 | Oldershaw et al. | 204/149 |
| 3,458,414 | 7/1969 | Crane et al. | 204/149 |
| 3,669,857 | 6/1972 | Kirkham et al. | 210/192 |
| 4,129,493 | 12/1978 | Tighe et al. | 204/228 |
| 4,136,005 | 1/1979 | Persson et al. | 204/266 |
| 4,149,952 | 4/1979 | Sato et al. | 204/258 |
| 4,224,154 | 9/1980 | Steininger | 210/169 |
| 4,256,552 | 3/1981 | Sweeney | 204/98 |
| 4,263,119 | 4/1981 | Mose et al. | 204/283 |
| 4,381,240 | 4/1983 | Russell | 210/746 |
| 4,409,074 | 10/1983 | Iijima et al. | 204/98 |
| 4,432,860 | 2/1984 | Bachot et al. | 204/296 |
| 4,496,452 | 1/1985 | Bianchi | 204/266 |
| 4,550,011 | 10/1985 | McCollum | 204/1 T |
| 4,574,037 | 3/1986 | Samejima et al. | 204/280 |
| 4,599,159 | 7/1986 | Hilbig | 204/266 |
| 4,627,897 | 12/1986 | Tetzlaff et al. | 204/128 |

Primary Examiner—John F. Niebling
Assistant Examiner—Steven P. Marquis
Attorney, Agent, or Firm—Oldham, Oldham & Weber Co.

[57] ABSTRACT

System for automatic control of chlorine content and pH in swimming pools. This system includes an electrolytic cell for generation of chlorine and caustic soda as needed, and an acid supply system for adding hydrochloric acid to the pool as required. Generation of chlorine and addition of acid are controlled automatically in response to sensed oxidation-reduction potential (ORP) and pH of the swimming pool water. The sensors for this purpose may be placed in a conventional pool recirculation line, and chlorine, caustic soda (which is co-produced with chlorine) and hydrochloric acid may be added to the pool via the recirculation line.

The electrolytic cell has a porous separator dividing the cell into anolyte and catholyte compartments. The latter is operated at a slightly higher pressure than the former. Chlorine generated in the cell is separated from spent brine, which is recirculated back to a brine tank where it is resaturated. The system may include a timer.

15 Claims, 3 Drawing Sheets

CHLORINATION AND PH CONTROL SYSTEM

TECHNICAL FIELD

This invention relates to chlorination systems and more particularly to chlorination and pH control systems for swimming pools, and to electrolytic cells useful in such systems.

BACKGROUND ART

It has been well known for years that chlorine is biocidally active, being able to kill bacteria and algae. The use of chlorine to kill bacteria in municipal water supplies is well known. Chlorine has also been used in swimming pools to kill bacteria and algae. Chlorine is most effective under mildly alkaline conditions, e.g. at a pH of about 7 to about 8, as is well known.

Swimming pools have normally been treated by adding chlorine in a chemical form, either gaseous chlorine or sodium or calcium hypochlorite, to the water in the pool. The chlorine is stored in bottles under pressure, and a rather elaborate and expensive system for adding chlorine from bottles to a pool is required. Furthermore, chlorine is toxic if released into the atmosphere. The use of bottled chlorine can be justified only in large pools where a skilled operator controls the addition of chlorine. Calcium and sodium hypochlorite are easier to use, and are better suited than chlorine for use in small pools or in pools where no skilled operator is available. However, sodium and calcium hypochlorite tend to degrade in the presence of moisture if stored for any substantial length of time.

Generally, the chlorine or hypochlorite is added manually, in response to a perceived need for addition by the pool owner or operator. The addition of chlorine tends to become rather haphazard, particularly in home swimming pools or other swimming pools where there is no operator. Frequently one will fail to add chlorine as needed with the result that algae may appear and bacterial contamination may reach an undesirably high level.

Automatic halogen and pH control systems for swimming pools are known, as shown for example in U.S. Pat. No. 4,550,011 to McCollum, but automatic systems have not enjoyed widespread use.

Swimming pool chlorination systems employing an electrolytic cell for generation of chlorine are well known. The source of chlorine may be either sodium chloride solution (brine) or hydrochloric acid solution. Examples of systems employing brine include U.S. Pat. No. 3,669,857 to Kirkham et al and U.S. Pat. No. 4,129,493 to Tighe et al. Systems employing hydrochloric acid include that shown in U.S. Pat. No. 3,351,542 to Oldershaw et al. Cells using sodium chloride are preferred because of the lower cost of sodium chloride as compared to hydrochloric acid. Also, cells using hydrochloric acid are not as safe as those using sodium chloride.

The principal chemical reactions which typically take place in an electrolytic cell for generation of chlorine from brine are shown in equations 1 and 2 below.

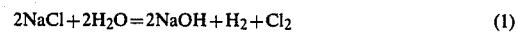

$$2NaCl + 2H_2O = 2NaOH + H_2 + Cl_2 \quad (1)$$

$$2H_2O = 2H_2 + O_2 \quad (2)$$

The primary reaction taking place is the electrolysis of brine, as shown by equation (1). Sodium hydroxide is co-produced with chlorine, as is well known. Some electrolysis of water takes place simultaneously; this secondary or side reaction is shown in equation (2). This results in the production of oxygen and hydrogen.

The ionic reactions taking place at the anode of the chlorine cell are shown in equations (3) and (4) below. Equation (5) shows the reaction taking place in the cathode.

$$4 Cl^- = 2Cl_2 + 4e^- \quad (3)$$

$$4 OH^- = 2H_2O + O_2 + 4e^- \quad (4)$$

$$4 H_2O + 4e^- = {}^4OH - 2H_2 \quad (5)$$

Chlorine and caustic soda, when introduced into a body of water such as a swimming pool, interact under mildly alkaline conditions according to equations (6) and (7) below to form a mixture of hypochlorous acid and sodium hypochlorite in solution.

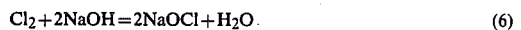

$$Cl_2 + 2NaOH = 2NaOCl + H_2O \quad (6)$$

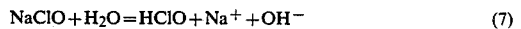

$$NaClO + H_2O = HClO + Na^+ + OH^- \quad (7)$$

Reduction of this specie takes place according to equation (8):

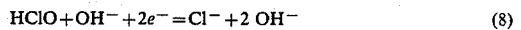

$$HClO + OH^- + 2e^- = Cl^- + 2 OH^- \quad (8)$$

When this hypochlorous acid reacts with the organic matter, the oxidation process can be written as:

$$OR(r) = OR(ox) + n \, e \quad (9)$$

where the OR(r) and OR(ox) indicates the reduced and oxidized organic matter, respectively.

Swimming pools may be broadly classified as either salt water pools and fresh water pools. Electrolytic cells can be used to generate chlorine for either type of pool. Cells for salt water pools typically have a single body of electrolyte, with no separator between the anode and the cathode. Cells for fresh water pools generally have an ion-selective membrane which divides the cell interior into anolyte and catholyte compartments.

Membrane type cells for swimming pool chlorination systems are shown for example in the Kirkham et al and Tighe et al patents cited above. The membrane separates the cell into anolyte and catholyte compartments. The membrane is typically impermeable to electrolyte and to anions, such as chloride and hydroxyl, while permitting migration of cations such as sodium. The principal advantage of a membrane is that sodium hydroxide produced in the catholyte compartment is substantially pure, since chloride ion, which otherwise would be a contaminant, cannot migrate from the anolyte compartment to the catholyte compartment. The disadvantages of membranes is that they are very expensive and they may fail suddenly and catastrophically due to cracking. A porous separator may be placed next to the membrane, as shown for example in U.S. Pat. No. 3,669,857 cited supra, in order to support the membrane and thereby protect the membrane (which is structurally weak) from fatigue and cracking.

Small chlorine cells employing a porous separator, e.g. a diaphragm, are known, as shown for example in Bianchi, U.S. Pat. No. 4,496,452. Kirkham et al, U.S. Pat. No. 3,669,857 cited supra, mentions a porous diaphragm as a less desirable alternative membrane. Although porous separators or diaphragms are widely used in electrolytic cells for commercial production of chlorine and caustic soda, cells employing porous separators are not used in swimming pool chlorination systems as far as applicant is aware.

Chlorine cells for swimming pools may have other disadvantages as well. For example, unreacted sodium chloride (spent brine) is usually added to the swimming pool along with chlorine gas which is generated, making the pool water undesirably salty. Note U.S. Pat. Nos. 3,669,857 and 4,129,493 (both cited previously) in this regard. Frequently, hydrogen gas is vented to the atmosphere as shown for example in U.S. Pat. No. 4,136,005 to Persson et al. This creates a safety hazard, particularly if anyone smokes in the area of the cell. Furthermore, there is typically no automatic control other than a timer to control the generation of chlorine. While a timer as the sole control may work reasonably well as long as chlorine demand remains reasonably constant and the timing cycle is properly set for that demand, systems relying on a timer as the sole control cannot compensate for excessive or diminished chlorine demand, the former occurring for example during extremely hot weather or when the pool is heavily used. Some swimming pool chlorination systems employing an electrolytic cell also have means for sensing the oxidation-reduction potential (ORP) of the pool water, but none as far as applicant is aware includes means for sensing both the ORP (which is a measure of chlorine content) and the pH of pool water with associated means for controlling the addition of chlorine and acid accordingly.

DISCLOSURE OF THE INVENTION

This invention, according to one aspect, provides a novel system for chlorination and pH control of a body of water. This system comprises: (a) sources of brine and water; (b) conduits for said brine and water connected to the respective sources; (c) an electrolytic cell for generation of chlorine and caustic soda from said brine and water, said cell comprising a porous separator dividing the cell into anolyte and catholyte compartments and forming the sole barrier between the compartments, the anolyte compartment including an anode, a brine inlet, separate outlets for spent brine and chlorine, and a separation chamber in which gas and liquid are separated, the catholyte compartment including a cathode, a water inlet, and an outlet for sodium hydroxide and hydrogen; (d) a recirculation conduit for recirculating spent brine from the anolyte compartment to the brine source; (e) a gas feed conduit for conveying chlorine from the anolyte compartment to the body of water; (f) an alkali feed conduit for conveying sodium hydroxide and hydrogen from the catholyte compartment to the body of water; (g) a source of acid; (h) a conduit for supplying said acid from said source to the body of water; (i) oxidation-reduction potential and pH control means including means for sensing the oxidation-reduction potential of water in said body and activating said electrolytic cell when the oxidation-reduction potential is below a predetermined level, and means for sensing the pH in the body of water and causing said acid to be fed to said body when the pH is above a predetermined value.

This invention according to another aspect provides a method for controlling the oxidation-reduction potential (ORP) and the pH of the body of water, which method comprises: (a) sensing the ORP and the pH of said body of water; (b) electrolyzing a brine, separating the chlorine so produced from spent brine, supplying the chlorine and at least a major portion of the sodium hydroxide and hydrogen so produced to said body of water when the ORP is below a predetermined value, the hydrogen and sodium hydroxide being supplied as a single stream; (c) supplying acid to the body of water when the pH is above a predetermined level.

A novel electrolytic cell having a porous separator is provided according to still another aspect of this invention. This cell comprises a plastic housing and a separator-electrode assembly dividing the cell into separate anolyte and catholyte compartments and comprising a porous separator, a perforated anode and a perforated cathode, the anode and cathode being in engagement with the separator on opposite sides thereof. The anolyte compartment includes the anode, an inlet for brine, and separate outlets for chlorine and spent brine, the chlorine outlet being at the top of the cell and the spent brine outlet being below the top of the cell, the space above the spent brine outlet constituting a separation chamber wherein gas and liquid are separated. The catholyte compartment includes the cathode, an inlet for water which may contain a small quantity of electrolyte and an outlet for sodium hydroxide and hydrogen.

According to preferred embodiments of the invention, the body of water is water contained in a swimming pool, and the system and method are a system and a method, respectively, for automatic chlorination and pH control in swimming pools.

BRIEF DESCRIPTION OF DRAWINGS

This invention will be described with respect to a preferred embodiment thereof, i.e. a system and a method for chlorination and pH in swimming pools.

In the drawings.

BEST MODE FOR CARRYING OUT INVENTION

Figure 1:
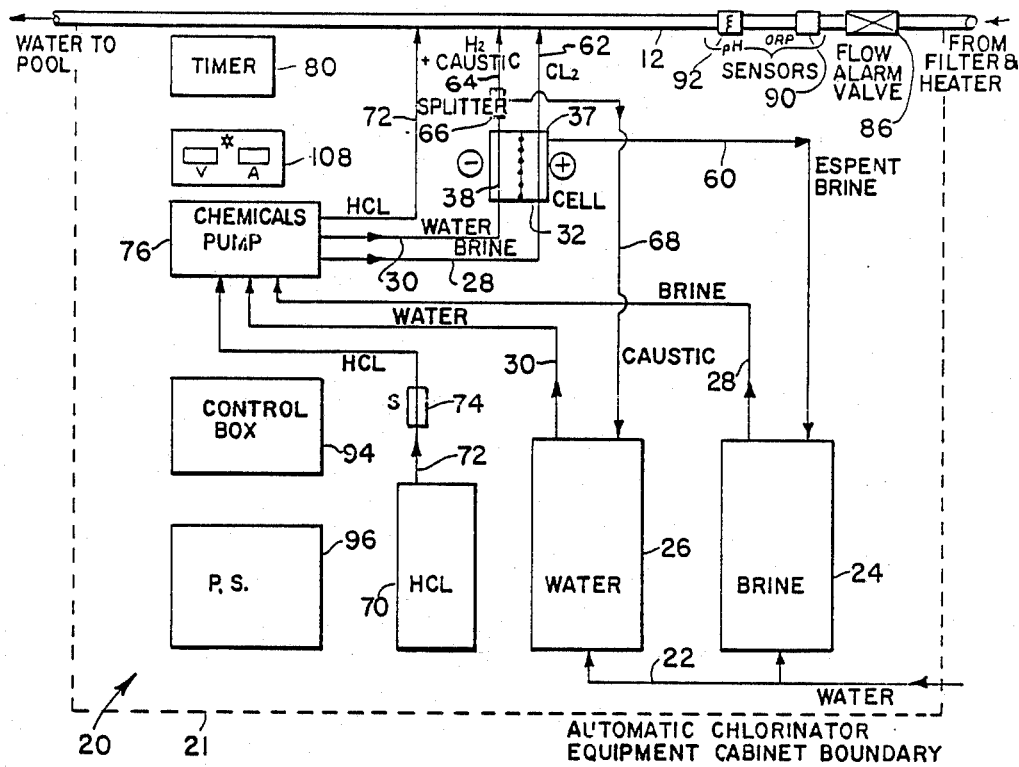
FIG. 1 is a schematic diagram of a chlorination and pH control system for swimming pools according to this invention.

The chlorination and pH control system of this invention is usable generally for treatment of bodies of water where both chlorination and pH control are desired. For example, this system can be used for treatment of municipal water supplies, by injection of chlorine and caustic soda into the water supply prior to flocculation. The system can also be used for waste water treatment. However, the system according to the preferred embodiment of this invention is a system for chlorination and pH control of swimming pools and this description will be directed to such systems.

The system herein described maintains the chlorine concentration and the pH level within desired limits, e.g. a chlorine concentration of at least 2 ppm and a pH from about 7 to about 8 (the range within which hypochlorite or hypochlorous acid is most effective as a biocide).

A swimming pool (not shown in the drawings) commonly has a recirculation line 12 (shown in FIGS. 1 and 2) which includes a recirculation pump and a filter and may include a heater. Since these elements are conventional, they have not been shown in the drawings. The portion of the recirculation line 12 shown is downstream of these elements and for the purposes of illustration, water flow through the recirculation line is from right to left, as shown by the arrow.

Referring now to FIG. 1, 20 indicates generally a chlorination and pH control system according to this invention. The system may be contained in a suitable cabinet or housing 21 (shown in chain lines). Water may be supplied to the system via a water pipe or main 22. Water pipe 22 may receive water from either a fresh water source or from the swimming pool. The system 20 includes a source of brine 24 and a source of water 26 both of which are shown as tanks. Both may receive water from water main 22. Brine tank 24 and water tank 26 may have separate water supplies if desired. For example, the swimming pool may supply brine tank 24 (since pool water is the preferred water source for the brine tank) while fresh water supplies water tank 26 (which can use either pool water or fresh water as its water source). Brine tank 24 contains undissolved salt (sodium chloride); saturated brine is prepared by dissolving sodium chloride and water in tank 24. Water tank 26 is optional; while this tank is useful for providing smoother water flow, it is possible to pipe water directly from main 22 into the system 20 as required.

A brine conduit 28 and a water conduit 30 are connected to the brine tank 24 and the water tank 26, respectively, and supply brine and water to the anolyte and catholyte compartments, respectively, of an electrolytic cell 32. A 3-chamber chemicals pump 76 having separate chambers for brine, water and acid is provided for pumping brine and water through conduits 28 and 30, respectively. This chemicals pump also pumps hydrochloric acid from an acid source to recirculation line 12 as will be described later.

Figure 3:
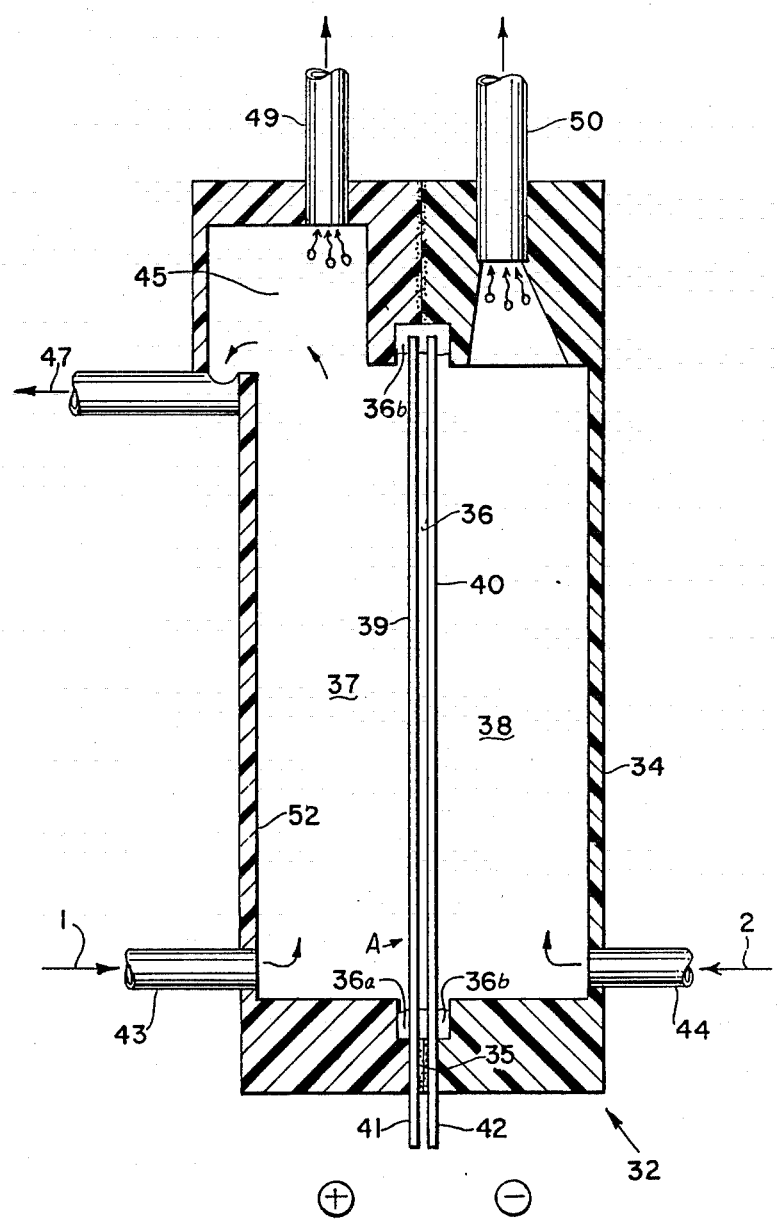
FIG. 3 is a vertical sectional view of a preferred electrolytic cell for the system of this invention.

Electrolytic cell 32 is shown in detail in FIG. 3.

Referring now to FIG. 3, cell 32 has a housing 34, which is preferably made of a plastic material that is resistant to brine and alkali, such as chlorinated polyvinyl chloride (CPVC), polyvinyl chloride (PVC), polytetrafluoroethylene ("Teflon", which is a registered trademark of E. I. DuPont de Nemours and Company) or other halocarbon. Housing 34 is made in two parts, which are joined together by a thin layer 35 of a suitable chemically resistant adhesive, such as silicone rubber. Alternatively, both sections may be bolted together. Cell 32 has a sandwich assembly A comprising a porous separator 36, a perforated anode 39 and a perforated cathode 40, which divides the interior of the cell into anolyte compartment 37 and catholyte compartment 38. Cell 32 is upright and separator 36 is vertical, as shown in FIG. 3. Assembly A extends the entire width and height of cell 32. The inside wall of cell 32 has a recess 36a, extending around the perimeter of the wall, to receive the edges of assembly A. Assembly A may be held in place by a suitable chemically resistant elastomeric adhesive 36b, such as silicone rubber. This type of adhesive is not only highly resistant to chemical attack, but it also allows for differential thermal expansions of the components of the cell as will be apparent from the description below. This adhesive may be replaced by a suitable gasket material.

Separator or diaphragm 36 may be made of asbestos paper, glass fiber mat, polypropylene fiber mat, or any other material that has the required porosity and can resist for a reasonable period of usage the chemical environment of the cell. The porosity of the diaphragm should be such as to minimize the flow of electrolytes between the anolyte and catholyte compartments, but should not be so tight as to increase considerably the electrical resistance between the electrodes. A preferred separator material is "E"-borosilicate glass fiberglass mat having an average pore size of about 5 microns and a thickness of about 1 millimeter (0.040 inch). This separator will permit both anions (e.g. chloride and hydroxyl) and cations (e.g., sodium) to migrate from one compartment to the other and will permit electrolyte to trickle from the cathode compartment to the anolyte compartment because of the differential pressure in the catholyte compartment, while preventing the flow of gases (hydrogen or chlorine) from one compartment to the other. Separator 36 constitutes the sole barrier between the anolyte and catholyte compartments 37 and 38, respectively; there is no membrane such as those commonly found in electrolytic cells for swimming pool service.

Anode 39 may be made of titanium metal with a suitable reactive coating of dimensionally stable anode (DSA) type or a platinized coating. The metal may be either expanded or punched in order to allow for easy passage of the electrolyte and chlorine gas generated during operation of the cell. Anode 39 has a solid tab (i.e., neither expanded nor punched) which extends to the outside of the cell (and indicated as connection 41 herein) to provide for the necessary electrical connection. Openings in the metal surface, either anode and cathode, produced either by punching or expanding, should have such dimension that the new effective generated surface area is not less than the original geometric surface area of the electrode. In the case of a punched metal surface, the hole diameter must not exceed 3 times the thickness of the anode, in order not to dimish the effective surface area. For example, if the thickness of the electrode is 0.04 inch (0.10 cm), the diameter of each hole should be 0.12 inch (0.30 cm). The hole diameter could be smaller but not larger. The holes may be close together in either rectangular or triangular order. Preferably the spacing between holes is of the same magnitude as the electrode thickness.

The relationship between maximum hole diameter and electrode thickness may be seen as follows: Let $d$ = the diameter of each hole and $t$ = the thickness of the anode. Let $A_1$ = the frontal area of metal punched out for each hole, $A_2$ = the actual area of the sidewall of each hole, and $A_3$ = the effective sidewall area of each hole. Assume a current efficiency factor of 0.75 (this factor is less than one because current density over the hole sidewalls is not uniform and decreases as one goes away from the frontal surface of the electrode. Then:

$$A_3 = 0.75\, A_2$$

$$A_2 = \pi dt;\ A_3 = 0.75\, \pi dt$$

$$A_1 = \pi d^2/4 = 0.25\, \pi d^2$$

The effective electrode surface area after punching must equal or exceed the actual electrode surface area before punching. In other words, the effective hole sidewall area created by punching must equal or exceed the frontal area of holes removed by punching. When these quantities are equal:

$A_3 = A_1$, or $A_1 = A_3$ $0.25\pi d^2 = 0.75 \pi dt$ $d = 3t$

As the above equations show, the effective electrode surface area is not diminished if the hole diameter is not greater than 3 times the electrode thickness.

Anolyte and catholyte compartments 37 and 38, respectively, contain, respectively, anode 39 and cathode 40, electrical connections 41 and 42 from the anode and cathode to a direct current (DC) power supply, brine inlet 43 and water inlet 44. The electrical connections 41 and 42 and the brine and water inlets 43 and 44, respectively, are located at the bottom of cell 32.

Cathode 40 may be made of either carbon steel or nickel, preferably nickel with a Raney nickel type coating. The cathode may be made either by punching or expanding a metal sheet or by welding a connection tab 42 to a woven wire metal screen. Thus, both anode 39 and cathode 40 are perforated metal electrodes.

Anode 39 and cathode 40 are in touching engagement with separator 36 on opposite sides thereof, in order to support the separator and obtain good current efficiency and low cell voltage in cell 32.

Anolyte compartment 37 has a separation chamber 45 near the upper end thereof, for separation of chlorine gas generated in the anolyte compartment from spent brine. Anolyte compartment 37 has separate outlets 47 and 49 for spent brine and chlorine gas, respectively. Spent brine outlet 47 is located a short distance below the top of cell 32, while the chlorine outlet 49 is at the top of the cell. Separation chamber 45 is the portion of anolyte compartment 37 which is above spent brine outlet 47. The level of brine in the anolyte chamber is at the level of spent brine outlet 47. Any oxygen gas generated in anolyte chamber 37 also leaves via outlet 49. The volume of oxygen generated is typically about 2 to 4 percent by volume of the total quantity of chlorine gas generated.

Catholyte compartment 38 has a single outlet 50 for both caustic soda (sodium hydroxide) and hydrogen formed in the catholyte compartment.

The pressure in catholyte chamber 38 is at least as high as the pressure in anolyte chamber 37, and is preferably slightly higher, e.g. about 0.01 to about 3.8 inches of water higher in the cell illustrated. This is easily accomplished because anolyte chamber 37 has a gas space (separation chamber 45) which is typically at a pressure only slightly above atmospheric pressure, while the entire catholyte compartment 38 is filled with liquid (a stream of catholyte liquid with gas entrained therein extends from catholyte chamber 38 all the way to pool recirculation line 12, as will be explained subsequently). It is desirable to maintain a catholyte pressure slightly higher than the anolyte pressure, in order to prevent migration of any electrolyte from the anolyte compartment to the catholyte compartment and to thereby prevent contamination of the caustic soda produced in the catholyte compartment 38 with salt.

Returning now to FIG. 1, spent brine withdrawn through brine outlet 47 is recirculated via spent brine recirculation line 60 back to brine tank 24, where it dissolves solid salt in that tank and thereby becomes resaturated.

Chlorine and small amounts of oxygen exiting cell 32 via outlet 49 are conveyed through gas feed conduit 62 to pool recirculation line 12. The point of introduction of chlorine into recirculation line 12 is downstream from the filter and heater in that line. It is desirable to introduce the gas stream through a venturi mixer (not shown) into the flowing water stream in line 12.

Sodium hydroxide and hydrogen are conveyed together through alkali feed conduit 64 to pool recirculation line 12. This stream of sodium hydroxide and hydrogen is introduced into recirculation line 12 through a venturi (not shown). Conduit 64 may have a splitter 66 for separation of a small quantity (say 1 to 5 percent) of the total caustic soda produced in cell 32. This quantity is recirculated back to water tank 26 and mixed with water which is delivered to cell 32, so that the incoming water in the cell will have adequate electrical conductivity. Other electrolytes besides caustic soda could be used for this purpose, but caustic soda is preferred because its use does not introduce any extraneous materials into the swimming pool. Most of the caustic soda and hydrogen are conveyed as a flowing fluid stream to the pool water recirculation line 12, downstream from the filter and heater. These materials are also preferably introduced into the flowing water in line 12 through a venturi mixer (not shown). The flowing stream in line 64 comprises a continuous liquid phase (aqueous caustic soda) with bubbles of undissolved hydrogen entrained therein. Hydrogen is conveyed along with caustic soda to the swimming pool in the manner described, so that it may be vented safely to the atmosphere. The hydrogen gas becomes dispersed over a wide area in the pool, so that it is vented harmlessly to the atmosphere. Also, the bubbles are so small that no appreciable local high concentration of $H_2$ is produced. On the other hand, if hydrogen and caustic soda were taken off separately from cell 32 and vented to the atmosphere near the cell, as is the case in some electrolytic cells, there is a danger that a flammable and possibly explosive hydrogen/air mixture would result. Also, the cell 32 herein does not produce any excess caustic. Some cells require the owner to remove the excess caustic. This operation could be dangerous.

Chlorine gas and caustic soda, which enter recirculation line 12 via conduits 62 and 64 respectively, react in line 12 or in the pool to form sodium hypochlorite in accordance with equation (6) given earlier.

System 20 also has an acid source 70, shown as a tank which contains acid in aqueous solution. Aqueous hydrochloric acid, containing about 15 to about 20 percent (by weight) HCl, is preferred. Acid from this source is introduced into recirculation line 12 whenever the water in the pool becomes too alkaline, (i.e., over pH=8). Aqueous hydrochloric acid is supplied from tank 70 to recirculation line 12 via conduit 72 and is introduced into recirculation line 12 downstream from the filter and heater. A solenoid valve 74 is provided in hydrochloric acid supply line 72 so that the flow of hydrochloric acid can be shut down as required. Downstream from solenoid valve 74 is 3-chamber chemicals pump 76 having separate chambers for streams of brine, water and hydrochloric acid flowing through conduits 28, 30 and 72, respectively. This pump is in operation whenever it is necessary to add either chlorine or hydrochloric acid to the swimming pool. Pump 76 has a single shaft and is driven by a single motor (not shown).

This pump maintains substantially the same outlet pressure in each of the three liquid streams. Other pump means, such as separate pumps in each of the conduits 28, 30 and 72, may replace the single pump 76 if desired. An advantage of the single pump as shown is that equipment and power requirements are less than would be the case if three separate pumps were used.

Figure 2:
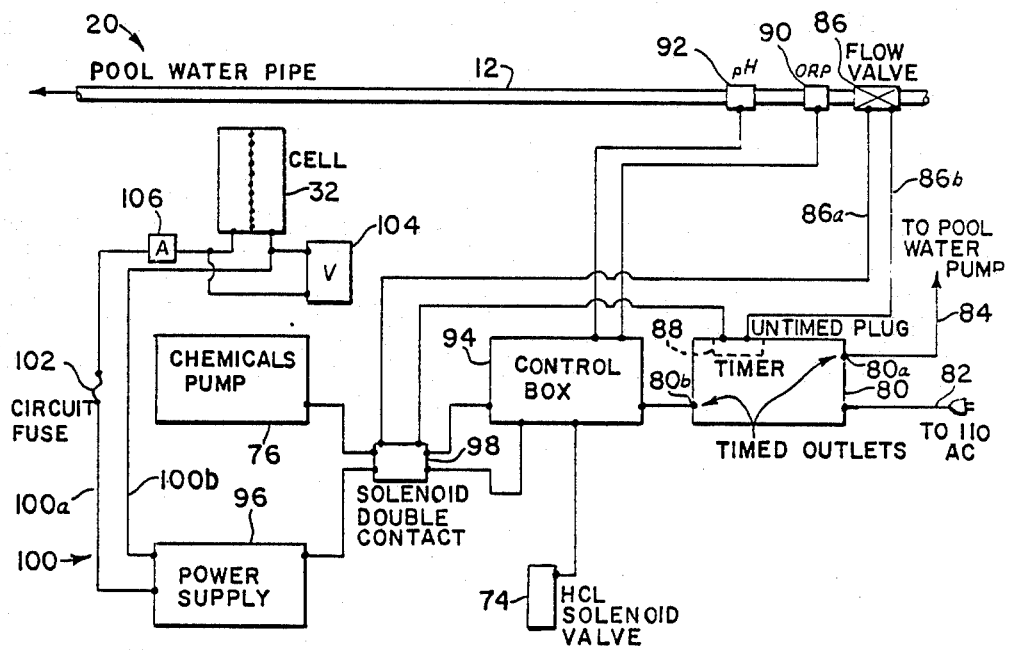
FIG. 2 is a block diagram of the electrical system required for operating the chlorination and pH control system of FIG. 1.

The electrical system for controlling the chlorination and pH control system 20 will now be described with particular reference to FIG. 2. Referring now to FIG. 2, system 20 may include a timer 80, which may be conventional. Timer 80 is connected to a power source, which may be a conventional 110 V alternating current (AC) line, via wire 82. Timer 80 may control a pool water pump (or recirculation pump) (not shown) via line 84 in addition to controlling the chlorination/pH control system 20. This is preferable to an independent control for the water pump.

A flow valve 86 in recirculation line 12 downstream from the pool water pump and filter (and heater when present), is provided in order to shut down the system 20 in the event that water flow in line 12 falls below a predetermined level. This valve may be connected to an alarm circuit (not shown) for actuating a visible or audible alarm in the event of shutdown if desired. Flow valve 86 is connected to the remainder of the electrical system through an untimed plug 88, which may be provided in the box which houses timer 80.

Oxidation-reduction potential (ORP) sensor 90, and a pH control sensor 92, are placed in recirculation line 12 downstream of flow valve 86. Each of these sensors conveys an input signal to control box 94. Control box 94 contains the electronic components necessary to maintain the ORP and the pH of the swimming pool at desired levels. The electronic mechanisms will be described with reference to FIG. 4.

Figure 4:
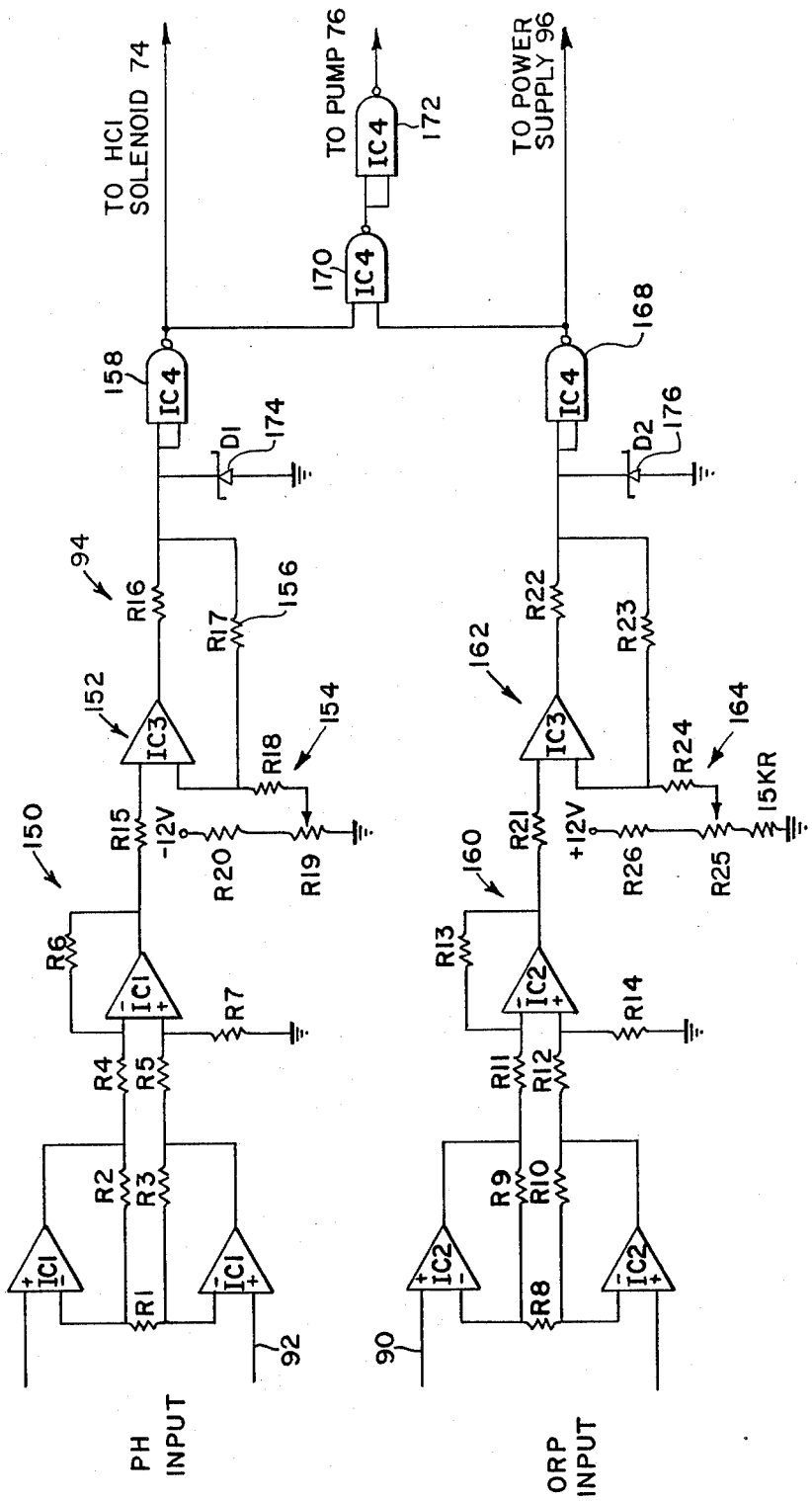
FIG. 4 is a circuit diagram of the electronic components for automatic pH and ORP control in the preferred electrical system.

With reference now to FIG. 4, a detailed understanding of the circuitry of control box 94 may be obtained. The output from the pH sensor 92 is applied to the high impedance amplifier 150 where the signal is scaled by an appropriate gain factor. The signal is then passed to a comparator 152 where it is compared against a threshold set by an adjustable reference circuit 154. The hysteresis feedback resistor 156 is provided to achieve a deadband in the output of the comparator 152. The output of the comparator 152 is inverted by the NAND gate 158 and thence applied to the solenoid 74 as shown and to the pump 76 as will be discussed below.

The output of the ORP sensor 90 is applied to a high impedance amplifier 160, again provided with appropriate gain to properly scale the signal for application to a comparator 162. The scaled signal is there compared against a threshold established by a variable threshold circuit 164, resulting in an output in the event that the threshold is exceeded. A hysteresis feedback resistor 166 is again provided to achieve a deadband in the output of the comparator 162. Such output is passed through the inverting NAND gate 168 to the power supply 96 as shown and to the pump 76 as will be discussed below.

The output of the NAND gate 158, associated with the pH circuit, and the NAND gate 168, associated with the ORP, are passed to the NAND gate 170 and thence to the inverter 172 for application to the pump 76. Accordingly, whenever either the ORP is too low or the pH is too high, the pump 76 will be activated.

Now with final attention to the circuitry of FIG. 4, it will be noted that the zener diodes 174, 176 are respectively positioned at the outputs of the comparators 152, 162 to limit the voltage levels applied to the respective NAND gates 158, 168.

It is apparent from the above description that power supply 96 and electrolytic cell 32 are activated whenever the ORP is too low (e.g., below about 2 parts per million of chlorine), that solenoid valve 74 is opened, permitting the flow of hyrochloric acid, whenever the pH is too high (e.g. above about 8), and that pump 76 is activated whenever either the ORP is too low or the pH is too high.

A solenoid double contact 98, which is controlled by flow valve 86 through electrical lines 86a, 86b, is interposed between the control box 94 on the one hand and the chemicals pump 76 and power supply 96 on the other, so that the chemicals pump 76 and power supply 96 cannot be activated whenever flow valve 86 is closed due to low flow through recirculation line 12.

Circuit 100 (including lines 100a and 100b) connecting DC power supply 96 with electrolytic cell 32 may include a circuit fuse 102, a volt meter 104 and an ammeter 106. The readouts of these meters may be displayed on an instrument panel 108, which is shown in FIG. 1. This instrument panel 108 may also be caused to show (by means of circuitry not shown) whether flow valve 86 is open or closed.

The system 20 can be built of any desired size, to match the chlorination requirements of the body of water being treated. Chlorine requirements vary, depending on the size of the pool, the number of pool users, the season of the year (more chlorine is required in the summer than in winter), the time of day (more chlorine is required during the day than at night), and to some extent on other factors, such as the intensity of sunlight and the air temperature, as is well known. For purposes of illustration, the system will be described in further detail with particular reference to a normally operated pool. Most states require a chlorine concentration between 1 to 2 ppm for disinfection purposes. In order to keep this chlorine concentration at all times, it is advisable (although not necessary) that the electrolytic chlorinator have a production capacity of about one pound per day of chlorine in a 30,000 gallon pool, assuming uninterrupted operation. However, full time operation of the system 20 is not required in order to maintain proper ORP in the swimming pool.

By way of example, a summer timing cycle may be as follows: on from 8:00 to 8:30 AM, 11:00 AM to noon, 3:00 to 4:00 PM, 7:00 to 8:00 PM, and 10:00 to 10:30 PM, (total 4 hours per day), off at other times. The timing cycle is under the control of the pool owner, and may be varied in accordance with anticipated chlorine demands. Timer 80 turns system 20 (and the pool water recirculation pump) on during the preset "on" times. To this end, timer 80 has timed outlets 80a and 80b; the first (80a) is connected via electrical line 84 to the pool water recirculation pump, and the second (80b) is connected to control box 94. (The timer 80 may have additional timed outlets, but they are not needed for this system). Thus the pool water pump, chemicals pump 76, control box 94 and power supply 96 are all shut down when timer 80 is in the off portion of its cycle.

Operation of system 20 will now be described with particular reference to FIG. 1.

When timer 80 is on, pool water recirculation pump (connected to timer 80 via electrical line 84) causes water from the swimming pool to recirculate through pipe 12. The oxidation-reduction potential (ORP) and the pH of this recirculating water area continuously sensed by ORP sensor 90 and pH sensor 92, respectively. Since these sensors 90 and 92 are located upstream of the locations at which chemicals are added, the ORP and pH values sensed by these sensors are very nearly equal to those in the pool.

Four possible conditions may obtain. These are as follows:

(1) The ORP is too low, indicating that more chlorine should be added (e.g., below 2 ppm of chlorine), but the pH is within desired range (i.e. below 8). Chemicals pump 76 is activated, the DC power supply 96 is turned on so that the electrolytic cell 32 generates chlorine, caustic soda and hydrogen, and solenoid valve 74 controlling the hydrochloric acid supply remains closed. This causes chlorine, caustic soda and hydrogen to be generated and to be supplied to the swimming pool.

(2) The pH is too high (i.e. above 8) but the ORP is within the desired range (i.e. above the minimum value). Chemicals pump 76 is activated, solenoid valve 74 is opened so that hydrochloric acid is supplied, and power supply 96 remains off so that electrolytic cell 32 is not in operation. Hydrochloric acid is supplied to recirculation line 12, but no addition of chlorine or caustic soda takes place.

(3) The ORP is too low and the pH is too high. Chemicals pump 76 is activated, solenoid valve 74 controlling hydrochloric acid is opened, and the power supply 96 is on so that cell 32 is in operation. Chlorine, caustic soda, hydrogen and hydrochloric acid are all supplied to recirculation line 12.

(4) Both the ORP and the pH are at acceptable values. No action is required, the chemicals pump 76 is off, the solenoid valve 74 controlling hydrochloric acid is closed and the power supply 96 is off. No chemicals are supplied to the pool.

Once the ORP has fallen below the preset minimum value and the chemicals pump 76 at power supply 96 have been turned on, these units remain on until the ORP rises to a second preset level, which is higher than the minimum value required to initiate operation. Similarly, once the pH has risen to above a predetermined maximum value (say 8) and chemicals pump 76 has been turned on and the HCl control solenoid valve 74 has been opened, pump 76 remains on and control valve 74 remains open until the pH falls below a second preset value, which is below the first predetermined maximum value, at which time chemicals pump 76 shuts down (unless required for supply of chlorine and caustic soda) and the solenoid valve 74 is closed. Operation in this manner is made possible by the dead-bands previously described with reference to FIG. 4. These deadbands are highly desirable so that the system does not hunt.

Operation of the system 20 herein will now be illustrated with reference to a specific example. According to this specific embodiment, porous separator 36 is a diaphragm made of compressed fiberglass having a pore size opening of 5 microns and a thickness of about 1 millimeter (0.04 in.); the geometrical surface area of both electrodes is 157 cm$^2$ (25 in$_2$), the design current density is 0.16 amp/cm$^2$ (1.00 amp/in.$^2$), and the total current is 25 amperes. Both brine and water are introduced into cell 32 at flow rates of at least about 10 ml/minute. The brine is saturated (above 300 grams/liter of NaCl). The hydrochloric acid supplied from tank 70 has a concentration of about 15 to 20 percent. Assuming a cell working at 80 percent efficiency, chlorine is generated at the rate of about 27 g/hr. It is to be understood that this is a specific example provided as an illustration of preferred parameters of operation, and in no way represents a limitation on the scope of the invention. Other suitable operating conditions will be apparent to those of ordinary skill in the art.

The chlorination and pH control system of the present invention possesses several advantages not generally possessed by other swimming pool chlorination systems. *First*, it automatically causes chlorine, caustic soda and hydrochloric acid to be added to a swimming pool as needed. Swimming pool chlorination systems frequently make no provision for addition of hydrochloric acid, and generally do not have any automatic control other than the timer. This is insufficient because chlorine demand may vary widely, depending upon rate of usage and other factors besides day versus night and summer versus winter.

*Second*, the present system adds no salt to the swimming pool other than the comparatively small amounts of salt formed in the pool by reaction of sodium hydroxide with chlorine or with hydrochloric acid. Instead, unconsumed salt or brine is recycled from the cell 32 back to the brine tank 24. As a result, salt concentration in the pool builds up much more slowly than is the case with most systems. Salt buildup can be reduced even further by recirculating pool water back to brine tank 24.

*Third*, the electrolytic cell of this invention uses a porous separator in contrast to the ion-selective membranes almost universally used in other fresh water pool chlorination systems employing electrolytic cells. The porous separator used herein is much less expensive than membranes, and is not prone to crack as membranes are. Furthermore, even if porous separator 36 herein should be perforated or ruptured, operation of cell 32 would continue although caustic soda would become mixed with brine.

Specific numerical values given herein, such as the ORP set point (2 ppm of chlorine) and the pH set point (pH 8), are given by way of illustration and not limitation.

While in accordance with patent statutes, a preferred embodiment and best mode has been presented, the scope of the invention is not limited thereto, but rather is measured by the scope of the attached claims.

What is claimed is:

1. A system for chlorination and pH control of a body of water having a recirculation line, said system comprising:
    (a) sources of brine and water;
    (b) conduits for said brine and water connected to the respective sources;
    (c) an electrolytic cell for generation of chlorine and caustic soda from said brine and water, said cell comprising:
    (1) an assembly comprising a porous separator, a perforated anode and a perforated cathode, said anode and said cathode being in engagement with said separator on opposite sides thereof, said separator dividing said cell into anolyte and catholyte compartments and forming the sole barrier between said compartment
    (2) said anolyte compartment including said anode, an inlet for said brine, a chlorine gas-spent brine separation chamber at the top thereof, and separate outlets for spent brine and chlorine;
    (3) said catholyte compartment including said cathode, an inlet for said water, and a single outlet at the top thereof for sodium hydroxide and hydrogen, said single outlet being the only outlet from said catholyte compartment;

(d) a recirculation conduit for recirculating spent brine from said anolyte compartment to said source of brine;

(e) a gas feed conduit for conveying chlorine gas from said anolyte compartment to said body of water;

(f) an alkali feed conduit for conveying sodium hydroxide and hydrogen as a single stream from said catholyte compartment to said body of water;

(g) a source of acid;

(h) a conduit for supplying acid from said source of acid to said body of water;

(i) oxidation-reduction potential and pH control means, said control means including means for sensing the oxidation-reduction potential of water in said body for activating said electrolytic cell when the oxidation-reduction potential is below a predetermined value; and means for sensing the pH in said body of water and causing said acid to be fed to said body when the pH is above a predetermined value, said means for sensing said oxidation-reduction potential and said pH being at locations remote from the streams of chlorine, sodium hydroxide and acid supplied to said body of water.

2. A system according to claim 1 in which said body of water is a swimming pool.

3. A system according to claim 1 including means for recirculating a small portion of the sodium hydroxide produced in said electrolytic cell and adding said sodium hydroxide to said water source.

4. A system according to claim 1 including a timer.

5. A system according to claim 1 including pump means for pumping said brine, said water and said acid through the respective conduits therefor.

6. A system according to claim 5 in which said pump means comprises a single pump having separate passageways therethrough for said brine, said water and said acid.

7. A system according to claim 6 further including a solenoid operated valve in said conduit for supplying acid.

8. A system according to claim 7 including a power supply for said electrolytic cell, means responsive to the sensed oxidation-reduction potential of said water for activating said power supply when the oxidation-reduction potential is below a predetermined level, means responsive to the sensed pH of said water for opening said solenoid valve when the pH is above a predetermined level, and means for operating said pump when either the oxidation-reduction potential is below said predetermined value or the pH is above said predetermined value.

9. A system according to claim 1 in which (1) said system includes a recirculation line for water in said body; (2) said chlorine, sodium hydroxide, hydrogen and acid are supplied to said recirculation line; and (3) said means for sensing said oxidation-reduction potential and said pH are located in said recirculation line upstream of the points of introduction of said chlorine, sodium hydroxide, hydrogen and acid.

10. A system according to claim 1 in which said anode and said cathode are in touching engagement with said separator.

11. A system according to claim 1 in which the inlets for water and brine are near the bottom of said cell.

12. A method for controlling the oxidation-reduction potential and the pH of a body of water, comprising:

(a) sensing the oxidation-reduction potential and the pH of said body of water;

(b) electrolyzing brine in an electrolytic cell divided into anolyte and catholyte compartments by a porous separator, separating the chlorine so produced from spent brine, and supplying the chlorine to said body of water when the oxidation-reduction potential is below a predetermined value;

(c) withdrawing from said cell in a single stream the entire quantity of sodium hydroxide and hydrogen produced therein, and supplying at least a major portion of said stream to said body of water;

(d) maintaining a higher pressure in said catholyte compartment than in said anolyte compartment in order to minimize brine diffusion to said catholyte compartment, and (e) supplying acid to said body of water when the pH is above a predetermined level, said oxidation-reduction potential and said pH being sensed at locations remote from the streams of chlorine, sodium hydroxide and acid supplied to said body of water.

13. A method according to claim 9 in which said body of water is a swimming pool.

14. A method according to claim 13 including recirculating a stream of water from said pool back to said pool, supplying said chlorine, said sodium hydroxide and hydrogen, and said acid to said stream of water, and sensing said oxidation-reduction potential and said pH in said stream of water at locations upstream from the points of introduction of said chlorine, said sodium hydroxide and hydrogen and said acid.

15. A method according to claim 12 including feeding brine and water to the bottom of said anolyte and catholyte compartments, respectively, and wherein said chlorine is separated from said spent brine at the top of said anolyte compartment.

* * * * *